United States Patent
Kim

(10) Patent No.: US 11,427,166 B2
(45) Date of Patent: Aug. 30, 2022

(54) ADAPTIVE AEB SYSTEM CONSIDERING STEERABLE PATH AND CONTROL METHOD THEREOF

(71) Applicant: HYUNDAI MOBIS CO., LTD., Seoul (KR)

(72) Inventor: Jae Yoon Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 185 days.

(21) Appl. No.: 15/930,793

(22) Filed: May 13, 2020

(65) Prior Publication Data

US 2020/0361430 A1 Nov. 19, 2020

(30) Foreign Application Priority Data

May 14, 2019 (KR) .......................... 10-2019-0056568

(51) Int. Cl.
*B60T 7/22* (2006.01)
*B60T 8/171* (2006.01)
(Continued)

(52) U.S. Cl.
CPC ............... *B60T 7/22* (2013.01); *B60T 8/171* (2013.01); *B60T 8/172* (2013.01); *B60T 8/174* (2013.01);
(Continued)

(58) Field of Classification Search
CPC . B60T 7/22; B60T 8/171; B60T 8/172; B60T 8/174; B60T 8/58; B60T 2201/022;
(Continued)

(56) References Cited

U.S. PATENT DOCUMENTS

| 2010/0014711 A1* | 1/2010 | Camhi | B60K 35/00 |
| | | | 382/104 |
| 2015/0360697 A1* | 12/2015 | Baek | B60W 40/09 |
| | | | 701/23 |

(Continued)

FOREIGN PATENT DOCUMENTS

| CN | 104192144 A | 12/2014 |
| CN | 104527638 A | 4/2015 |

(Continued)

OTHER PUBLICATIONS

Kim et al., "Adaptive AEB control logic design based on steerable path decision for multi-target vehicles", KSAE 2018 Annual Spring Conference of the Korean Society of Automotive Engineers, Jun. 8, 2018, pp. 791-796.

(Continued)

*Primary Examiner* — Mary Cheung
(74) *Attorney, Agent, or Firm* — Morgan, Lewis & Bockius LLP

(57) ABSTRACT

Disclosed is an adaptive autonomous emergency braking (AEB) control method. An adaptive AEB control method includes identifying a front vehicle to be avoided on the basis of front-view information acquired through a front-view sensor, setting a steering avoidable area on the basis of speed information and lateral acceleration information of a host vehicle, adaptively determining an AEB activation time point on the basis of whether a vehicle is present in the set steering avoidable area, and controlling AEB activation on the basis of the adaptively determined AEB activation time point.

16 Claims, 7 Drawing Sheets

(51) Int. Cl.
*B60T 8/172* (2006.01)
*B60T 8/58* (2006.01)
*B60T 8/174* (2006.01)

(52) U.S. Cl.
CPC .......... *B60T 8/58* (2013.01); *B60T 2201/022* (2013.01); *B60T 2210/32* (2013.01); *B60T 2220/00* (2013.01); *B60T 2250/00* (2013.01); *B60T 2250/04* (2013.01); *B60T 2260/00* (2013.01)

(58) Field of Classification Search
CPC ............. B60T 2210/32; B60T 2220/00; B60T 2250/00; B60T 2250/04; B60T 2260/00; B60T 8/17558; B60T 7/14; B60W 30/09; B60W 2520/10; B60W 2520/125; B60W 30/095; B60W 40/02; B60W 40/08; B60W 40/105; B60W 40/109; B60W 2040/0827; B60W 2040/0872; B60W 2420/42; B60W 2420/52; B60W 2540/18; B60Y 2300/09; B60Y 2300/095
See application file for complete search history.

(56) References Cited

U.S. PATENT DOCUMENTS

| | | | |
|---|---|---|---|
| 2018/0297591 A1* | 10/2018 | Minemura | B60W 50/14 |
| 2019/0005821 A1* | 1/2019 | Matsunaga | B60W 50/0097 |
| 2019/0073906 A1* | 3/2019 | Matsunaga | B60W 30/0956 |

FOREIGN PATENT DOCUMENTS

| | | | | |
|---|---|---|---|---|
| CN | 106184202 A | | 12/2016 | |
| CN | 106945663 A | | 7/2017 | |
| CN | 108382392 A | | 8/2018 | |
| DE | 102005027845 A1 | * | 1/2007 | ................ B60T 7/22 |
| EP | 3225486 A1 | * | 10/2017 | ......... B60R 21/0134 |
| JP | 2012106592 A | * | 6/2012 | |
| KR | 10-2015-0071568 A | | 6/2015 | |
| KR | 10-2016-0010083 A | | 1/2016 | |
| WO | WO-9930919 A1 | * | 6/1999 | ......... B60K 31/0008 |

OTHER PUBLICATIONS

Office Action and Search Report issued in corresponding Chinese Patent Application No. 202010409484.0 dated Jan. 29, 2022, with English translation.

* cited by examiner

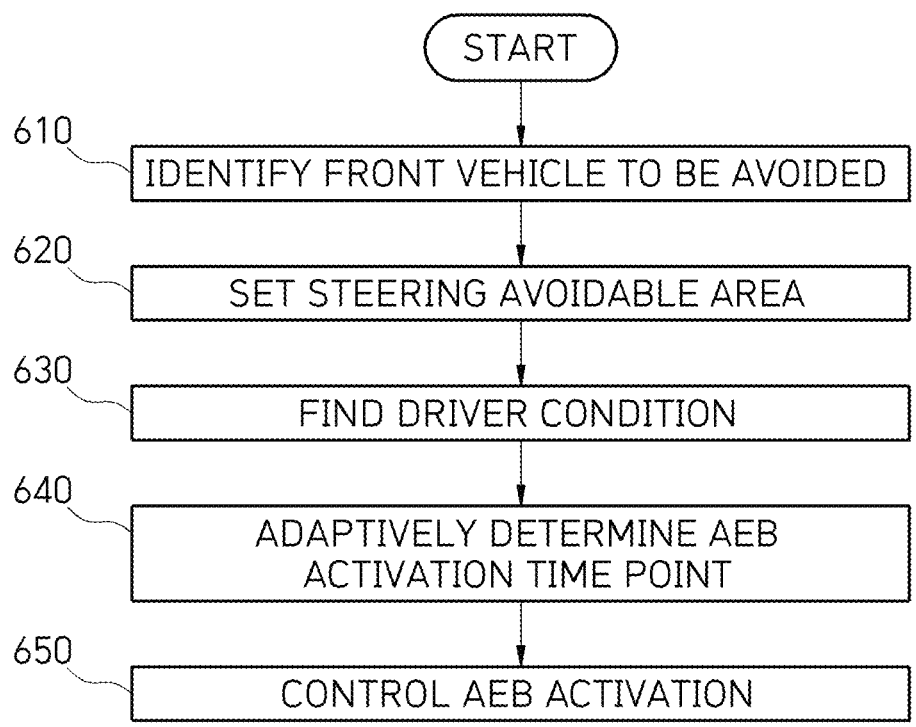

ADAPTIVE AEB SYSTEM CONSIDERING STEERABLE PATH AND CONTROL METHOD THEREOF

CROSS-REFERENCE TO RELATED APPLICATION

This application claims priority to and the benefit of Korean Patent Application No. 10-2019-0056568, filed on May 14, 2019, the disclosure of which is incorporated herein by reference in its entirety.

BACKGROUND

1. Field of the Invention

The present invention relates to an autonomous emergency braking (AEB) system and a control method thereof, and more particularly, to an adaptive AEB considering a surrounding situation of a host vehicle and a control method thereof.

2. Discussion of Related Art

Advanced driver-assistance systems (ADAS) are vehicle safety systems that are rapidly spreading to the market and are systems that detect a collision risk using various sensors (including cameras, environmental sensors, and detection sensors) installed in a vehicle to warn a driver of an accident risk, perform speed deceleration and emergency braking for automatically avoiding front or side collisions, or perform lane departure warning, blind-spot monitoring, and improved rear monitoring.

An autonomous emergency braking (AEB) system, which is a related system, is also being rapidly applied to both research and commercial vehicles. An AEB system is one driver driving-safety aid and a system that reduces collision damage by warning a driver and providing appropriate braking control when the driver is not aware of a front collision risk or when an unexpected situation occurs and a collision (including a head-on collision and a rear-ending) is imminent.

The basic operation of traditional AEB systems includes recognizing vehicles ahead or, in some cases, pedestrians, through environmental sensors such as front-view cameras and radars, bringing attention to a driver through a human machine interface (HMI), such as through hearing and sight, when a detected target and a potential collision risk are discerned, and avoiding a collision with an object ahead and reducing collision speed by raising a warning level and by using an appropriate braking command when a collision is imminent.

However, a traditional AEB system according to a related art as shown in FIG. 1 determines whether to perform emergency braking on the basis of only the presence of a vehicle and/or a pedestrian located ahead in a driving path and does not consider vehicles in lanes to the left and right of the driving path. Therefore, AEB braking may intervene in a situation that can even be avoided by a normal driver through a steering operation, and thus the probability of a sensitive operation or a malfunction increases, which can greatly affect the reliability of the system.

In addition, an accident risk exists because it is impossible to distinguish a situation in which steering avoidance is not possible or should not be performed, for example, a case where other vehicles are located ahead in left and right lanes or a vehicle is cut off.

SUMMARY OF THE INVENTION

The present invention is directed to providing an autonomous emergency braking (AEB) system considering the presence or absence of vehicles in left and right adjacent lanes within a certain distance as well as vehicles ahead in a driving path, and a control method thereof.

The present invention is also directed to providing an AEB system considering a driver condition along with the presence or absence of vehicles in left and right adjacent lanes within a certain distance as well as vehicles ahead in a driving path.

According to an aspect of the present invention, there is an adaptive autonomous emergency braking (AEB) control method including identifying a front vehicle to be avoided from a front side of a driving lane on the basis of front-view information acquired through a front-view sensor, setting a steering avoidable area on the basis of speed information and lateral acceleration information of a host vehicle, adaptively determining an AEB activation time point on the basis of whether a front vehicle is present in the set steering avoidable area, and controlling AEB activation on the basis of the adaptively determined AEB activation time point.

The identifying of a front vehicle to be avoided may include identifying the front vehicle to be avoided in further consideration of vehicle state information received from an environmental sensor, and the vehicle state information may include at least one piece of information regarding a vehicular speed, acceleration, and steering direction.

The adaptive determining of an AEB activation time point may include determining to advance the AEB activation time point when a vehicle is present in the set steering avoidable area, and the adaptive determining of an AEB activation time point may include determining to delay the AEB activation time point when no vehicle is present in the set steering avoidable area.

The setting of a steering avoidable area may include setting a safe steerable area, determining an expected driving path for the host vehicle, and setting a portion of the safe steerable area excluding an area included in the expected driving path as the steering avoidable area.

According to another aspect of the present invention, there is an adaptive autonomous emergency braking (AEB) system including a front vehicle determination unit configured to identify a front vehicle to be avoided on the basis of front-view information received from a front-view sensor and vehicle state information received from an environmental sensor, a steering avoidance determination unit configured to determine whether steering avoidance is possible on the basis of the front-view information received from the front-view sensor and vehicle state information received from the environmental sensor, and an AEB control unit configured to determine AEB control on the basis of front-vehicle-to-be-avoided information received from the front vehicle determination unit and steering avoidability determination information received from the steering avoidance determination unit.

The AEB control unit may deliver, to a vehicle braking unit, an AEB control comment for instructing the vehicle braking unit to perform AEB activation at a standard time point when the steering avoidability determination information which is associated with the front vehicle to be avoided and which is received from the front vehicle determination unit indicates that the steering avoidance is possible.

The front vehicle determination unit may find a change in a vehicular heading angle from at least one of a steering angle sensor and a gyro sensor of an AEB vehicle and may determine a front vehicle in consideration of the change.

The environmental sensor may include at least one piece of information regarding a vehicular speed, acceleration, and steering direction, and the front-view sensor may include a radar, a camera, and a fusion of the radar and the camera.

The steering avoidance determination unit may receive driver condition information from at least one of an internal camera and a biometric signal sensor, each of which provides information regarding the driver condition, and may determine whether steering avoidance is possible.

According to still another aspect of the present invention, there is an adaptive autonomous emergency braking (AEB) control method including identifying a front vehicle to be avoided from a front side of a driving lane on the basis of front-view information acquired through a front-view sensor, setting a steering avoidable area on the basis of speed information and lateral acceleration information of an AEB vehicle, acquiring driver condition information using at least one of an internal camera and a biometric signal sensor and determining whether a driver is able to perform normal braking, adaptively determining an AEB activation time point on the basis of whether a vehicle is present in the set steering avoidable area, a relative speed, and whether the driver is able to perform normal braking, and controlling AEB activation on the basis of the adaptively determined AEB activation time point.

The driver condition information may include at least one of whether the driver is drowsy while driving, the driver's gaze direction, and whether the driver is able to drive.

BRIEF DESCRIPTION OF THE DRAWINGS

FIG. 6 is a flowchart describing an adaptive AEB control method according to another embodiment of the present invention.

DETAILED DESCRIPTION OF EXEMPLARY EMBODIMENTS

Figure 1:
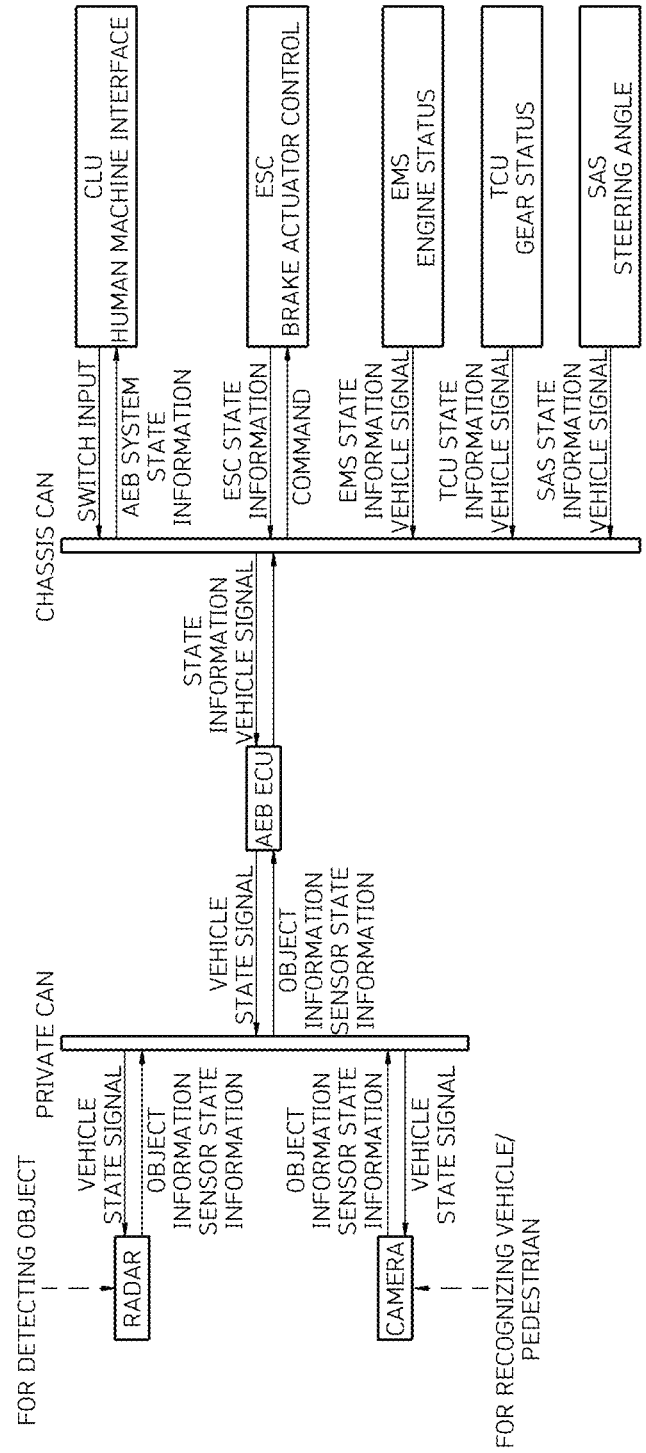
FIG. 1 is a conceptual view for describing an autonomous emergency braking (AEB) system according to a related art.

While the present invention is susceptible to various modifications and has several embodiments, some embodiments are shown by way of example in the drawings and will herein be described in detail. It should be understood, however, that there is no intent to limit the present invention to particular embodiments, but on the contrary, the present invention is to cover all modifications, equivalents, and alternatives falling within the technical spirit of the present invention.

Terms such as first, second, and the like may be used to describe various elements, but the elements are not limited by the terms. These terms are only used to distinguish one element from another. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing disclosed embodiments only and is not intended to be limiting of the invention. As used herein, the singular forms "a," "an," and "the" are intended to include the plural forms as well, unless the context clearly indicates otherwise. Herein, it should be understood that the terms "comprises," "comprising," "includes," and/or "including" when used herein, specify the presence of stated features, integers, steps, operations, elements, components, and/or combinations thereof, but do not preclude the presence or addition of other features, integers, steps, operations, elements, components, and/or combinations thereof.

Unless otherwise specified, all terms (including technical and scientific terms) used herein have the same meaning as commonly understood by those skilled in the art and should not be interpreted to have an ideal or excessively reduced formal meaning. When the meaning of a term is defined herein, the term should be interpreted as defined.

Hereinafter, exemplary embodiments of the present invention will be described in more detail with reference to the accompanying drawings. In order to facilitate the general understanding of the present invention, like reference numerals are used for like elements in the drawings, and repeated descriptions thereof will be omitted.

As described above, an autonomous emergency braking (AEB) function is a system configured to detect the possibility of a vehicle equipped with an AEB system (hereinafter referred to as an AEB vehicle) colliding with a vehicle located ahead (hereinafter referred to as a front vehicle) in a lane where the AEB vehicle is traveling (hereinafter referred to as a driving lane), configured to warn a driver, and configured to automatically brake the AEB vehicle in order to alleviate and avoid a collision accident when it is determined that there is no relevant response from the driver or that a collision with the vehicle ahead is inevitable.

As shown in FIG. 1, the AEB system according to the related art recognizes a front vehicle and/or pedestrian through a front-view sensor (hereinafter also referred to as an environmental sensor) such as a camera and a radar for front-viewing.

When it is determined that an AEB vehicle is highly likely to collide with a recognized front vehicle, the AEB system brings attention to the driver through a human machine interface (HMI) such as hearing and sight. When the collision is discerned to be imminent, the AEB system attempts to avoid the collision with the front vehicle or performs speed reduction and/or braking for collision prevention and shock mitigation through an increased warning level and a proper braking command for the driver of the AEB vehicle. In this regard, in order to determine the risk of collision with a front vehicle, it is necessary to compute an index such as a time-to-collision (TTC) related to the determination of whether a front vehicle driving path is invaded based on an expected driving path and the determination of a braking time point.

On the other hand, in order to improve the performance and safety of AEB, when operating in a medium- or high-speed area (a section where a relative speed difference with a front vehicle is greater than or equal to 60 kph), such as a bottleneck section of a highway or a general road, a highway entrance, or a roundabout, AEB technology is needed to avoid collisions with low-speed or stationary vehicles or minimize vehicle damage.

However, when only the advance of the TTC is considered in order to avoid collisions in the medium- or high-speed area, automatic braking may be performed by the AEB system even in a situation where a collision with a front vehicle can be avoided just with the steering operation of the driver of the AEB vehicle. Due to such a sensitive operation of the AEB system, the probability of malfunction of the AEB system increases, and this may greatly affect the reliability of the AEB system.

Therefore, in order to smoothly perform AEB operation in the medium- or high-speed area while maintaining the reliability of the AEB system, it is necessary to monitor the risk of collision with vehicles in adjacent lanes (hereinafter referred to as adjacent vehicles) which is caused by the steering operation toward adjacent lanes to the left and right of a driving lane as well as the risk of collision with a vehicle ahead. An adaptive AEB system according to an embodiment of the present invention, which is for smoothly performing AEB operation in a medium- or high-speed area while maintaining the reliability of the AEB system, will be described below.

On the other hand, a great difference between the AEB system according to the present invention and the AEB system of the related art is that the AEB system of the related art is targeted to determine a vehicle ahead in a host vehicle driving lane whereas the AEB system according to the present invention is targeted to determine vehicles and pedestrians in left and right adjacent lanes as well as a driving lane.

Therefore, in the following embodiments and claims according to the present invention, the term "front vehicle" means not only a vehicle located ahead in a driving lane but also a vehicle and pedestrian located ahead in left and right adjacent lanes. In addition, the term "left and right adjacent lanes" means not only the left and right lanes adjacent to the driving lane but also left and right lanes that are included in a steering avoidable path determined by the speed and lateral acceleration of a host vehicle at any time point, such as left and right lanes next to the adjacent lanes or left and right lanes next to the left and right lanes.

Figure 2:
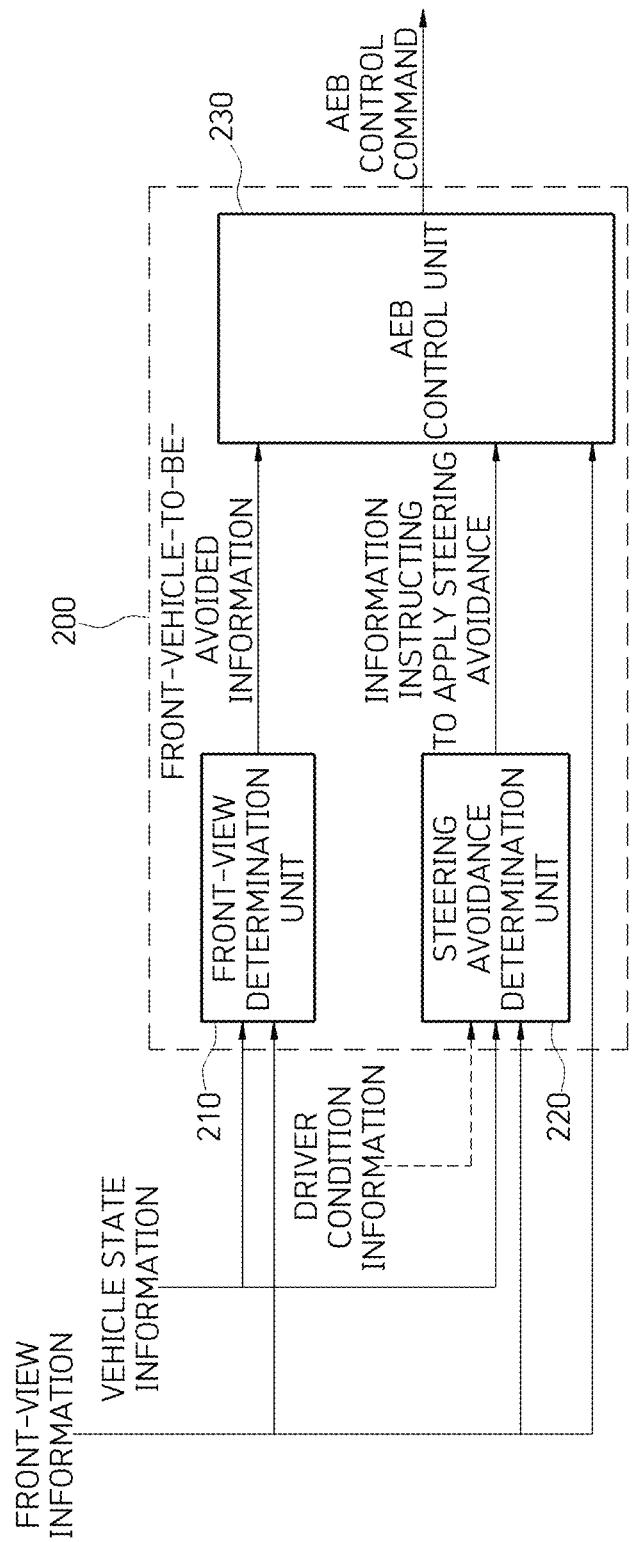
FIG. 2 is a block diagram for describing an adaptive AEB system according to an embodiment of the present invention.

FIG. 2 is a block diagram illustrating an adaptive AEB system according to an embodiment of the present invention.

An adaptive AEB system 200 according to an embodiment of the present invention includes a front vehicle determination unit 210 configured to identify (including "determine" and "recognize") a front vehicle on the basis of front-view information and/or vehicle state information, a steering avoidance determination unit 220 configured to determine whether steering avoidance is possible on the basis of the front-view information and the vehicle state information, and an AEB control unit 230 configured to adaptively (including "variably") determine an AEB driving time point on the basis of information originating from the front vehicle determination unit 210 and the steering avoidance determination unit 220 to generate an AEB control command for controlling a braking unit.

The front vehicle determination unit 210 receives front-view information from a front-view sensor (not shown) installed in a vehicle and identifies (determines) a front vehicle.

Also, a traveling host vehicle (hereinafter referred to as an AEB vehicle) may more accurately determine whether a front vehicle is present by determining whether there is a front vehicle (including a pedestrian or an object) in an expected driving path by using environmental sensors such as a steering angle sensor, a gyro sensor, an acceleration sensor, a position sensor, and an inter-vehicle distance sensor, as well as a front-view sensor such as a radar and a camera. For example, when it is determined, through an environmental sensor such as a steering angle sensor or a gyro sensor, that the AEB vehicle is turning left, the front vehicle does not mean a vehicle ahead in a vehicular heading angle direction at the current time point but means a vehicle or pedestrian located in front of and to the left of the AEB vehicle.

When a front vehicle is present, the AEB vehicle finds a relative speed and a relative distance with respect to the front vehicle. Preferably, the AEB vehicle may find the lateral acceleration of the front vehicle in order to determine whether the front vehicle is entering or exiting (this process is called identification or determination of the front vehicle).

On the other hand, in embodiments of the present invention, for convenience, the front-view sensor and the environmental sensor are distinguished from each other, and their roles or functions are not limited by the terms. Also, the front-view sensor may be based on a single radar or camera but does not exclude a plurality of radars or cameras. In addition, the front-view sensor may also be formed as a combination of a radar, a LiDAR, and a camera. The front-view information according to an embodiment of the present invention, which is information regarding the front vehicle which is received through the front-view sensor, includes image information of the front vehicle (for identifying a vehicle type or target, such as cars, trucks, and the like) and information for identifying the relative speed, relative distance, lateral acceleration, and the like of the recognized front vehicle.

The vehicle state information according to an embodiment of the present invention includes the speed, steering direction, acceleration (including the longitudinal acceleration and the lateral acceleration), and the like of the AEB vehicle, and the front vehicle determination unit 210 identifies the front vehicle and calculates (finds, recognizes, and the like) the relative speed, relative distance, lateral acceleration, and the like with respect to the front vehicle on the basis of the front-view information and the vehicle state information.

When the front vehicle is located within a predetermined distance, when the front vehicle is so slow that the distance from the AEB vehicle is sharply reduced, or when the front vehicle is entering from an adjacent lane, the front vehicle is classified as a front vehicle configured to be avoided.

As described above, the term "front vehicle" used herein refers to an object such as a vehicle or a pedestrian ahead in a left or right adjacent lane (i.e., a lane on a steering avoidable path) as well as a vehicle ahead in a driving path.

The front vehicle determination unit 210 transfers, to the AEB control unit 230, front-vehicle-to-be-avoided information. The front-vehicle-to-be-avoided information may include the type of the recognized front vehicle and the relative speed, relative distance, and lateral acceleration information with respect to the front vehicle.

The steering avoidance determination unit 220 according to an embodiment of the present invention receives the front-view information from the front-view sensor and/or receives the vehicle state information from the environmental sensor and determines whether the AEB vehicle can perform steering avoidance for the front vehicle. The steering avoidance refers to an operation of steering the vehicle to the left and right to avoid collisions.

That is, the steering avoidance determination unit 220 determines whether the driver of the AEB vehicle can normally perform steering avoidance on the basis of the locations of front vehicles and the relative speed with respect to the front vehicle to be avoided, which are derived from the front-view information originating from the front-view sensor and the vehicle state information originating from the environmental sensor.

In detail, the steering avoidance determination unit 220 according to an embodiment of the present invention determines a steerable area (a left or right adjacent lane within a certain distance (e.g., +/−3 m) from a driving lane) in consideration of the current speed of the AEB vehicle and a lateral acceleration which ensures that the AEB vehicle is safely traveling, as expressed in Formula 1:

$$SR=f(Vs,\text{Lat\_accel}) \quad \text{[Formula 1]}$$

Here, SR means a steerable radius and indicates a steering avoidable area for determining whether to perform early AEB control, Vs is the speed of the AEB vehicle, and Lat_accel indicates an allowable lateral acceleration that considers vehicle traveling safety at the speed of the AEB vehicle.

Figure 5:
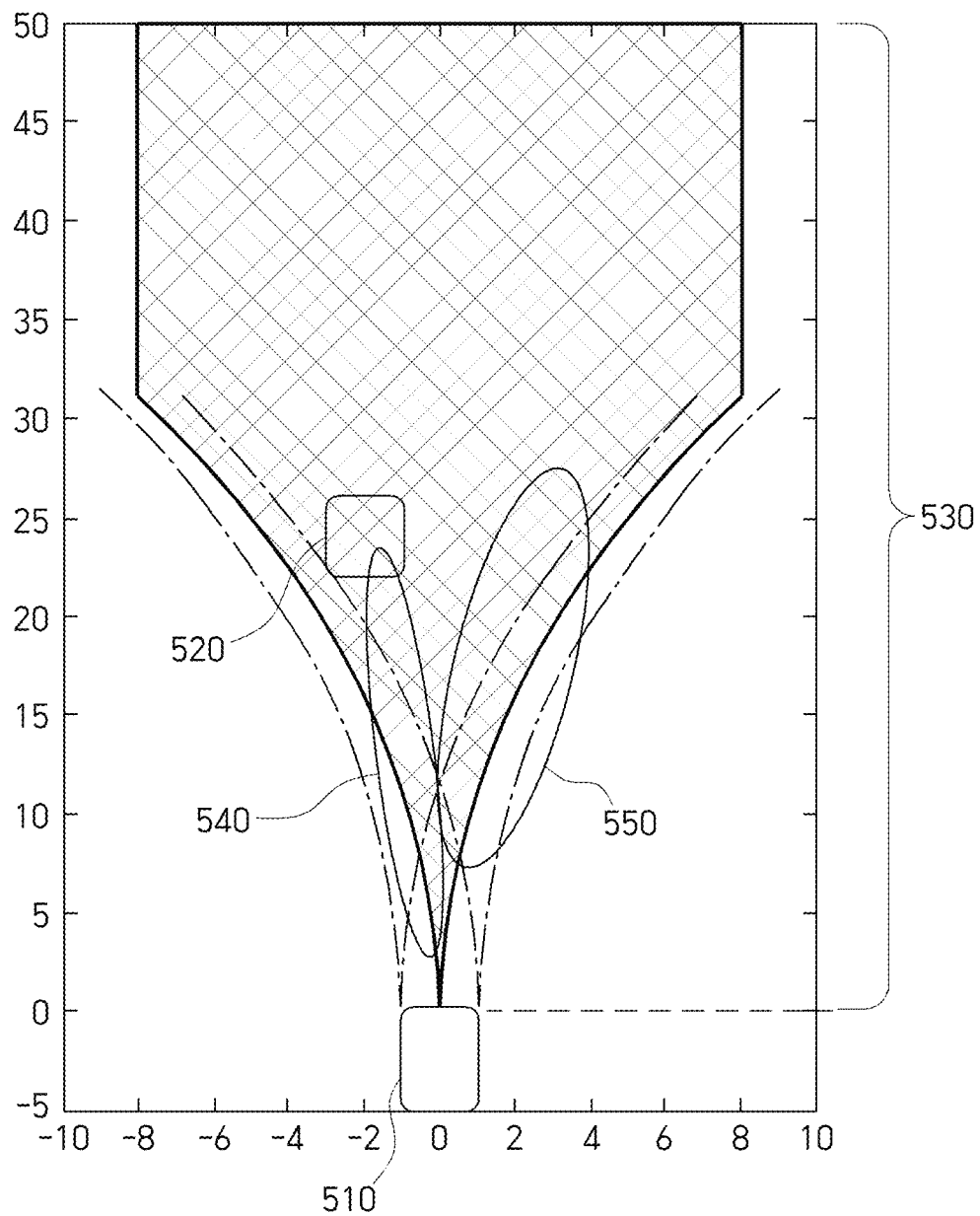
FIG. 5 is a conceptual view for illustrating a steering avoidance monitoring section according to an embodiment of the present invention.

The safe steerable area calculated using Formula 1 is as illustrated in FIG. 5.

The steering avoidable area is equal to the safe steerable area illustrated in FIG. 5 except for an area in an expected driving path of the AEB vehicle.

The predicted driving path is determined by finding out whether the vehicle is traveling straight, turning, or changing lanes through an environmental sensor such as a steering angle sensor, a gyro sensor, and the like and predicting a subsequent driving path.

Alternatively, the front area of the heading angle of the AEB vehicle becomes the predicted driving path, and thus the front area of the left or right lane may be the steering-avoidable area. However, for example, when it is determined that the vehicle is turning or changing lanes, the forward path on the left or right of the vehicle may be the predicted driving path. In some cases, accordingly, a lane in which the AEB vehicle is currently traveling may be the steering avoidable area.

After the steering avoidable area is set through the above-described process, steering avoidability determination information is generated depending on the presence or absence of a front vehicle to be avoided in the steering avoidable area.

When a vehicle is present in the derived steering avoidable area, the steering avoidance is undesirable. Thus, the steering avoidance determination unit 220 delivers steering avoidability determination information to the AEB control unit 230 (e.g., flag=0).

When no vehicle is present in the steering avoidable area, the steering avoidance determination unit 220 delivers steering avoidability determination information to the AEB control unit 230 so that the steering avoidance is possible (e.g., flag=1).

Figure 4A:
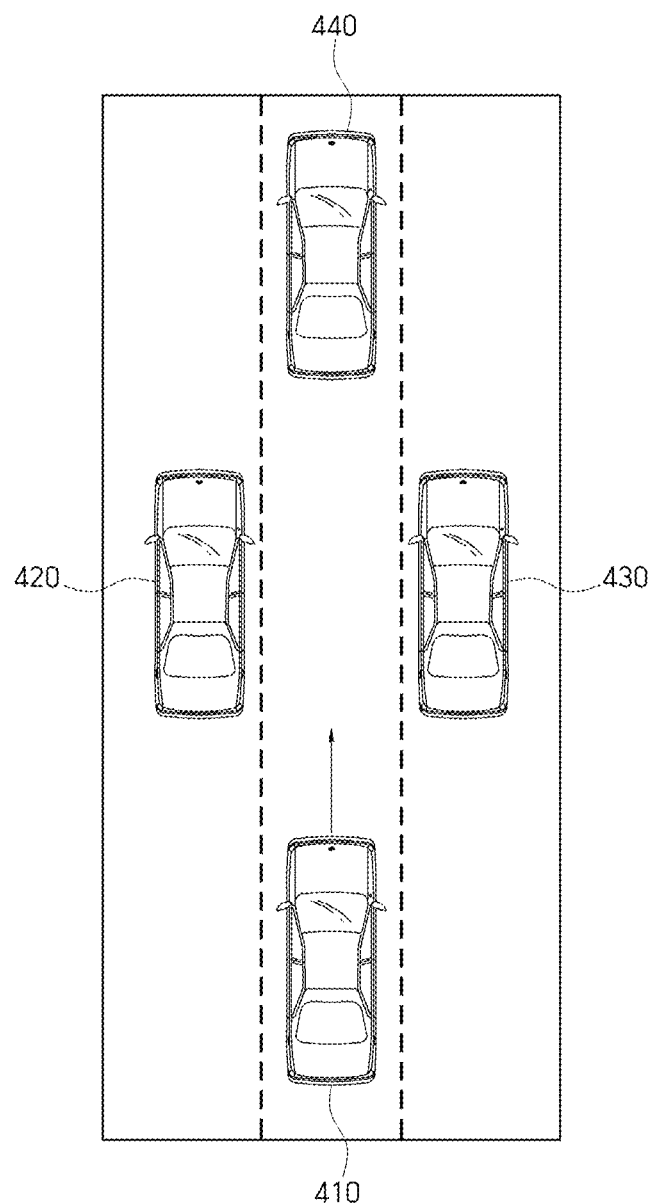
FIG. 4A is a conceptual view for describing one scenario in which an AEB system is applied according to the present invention.
Figure 4B:
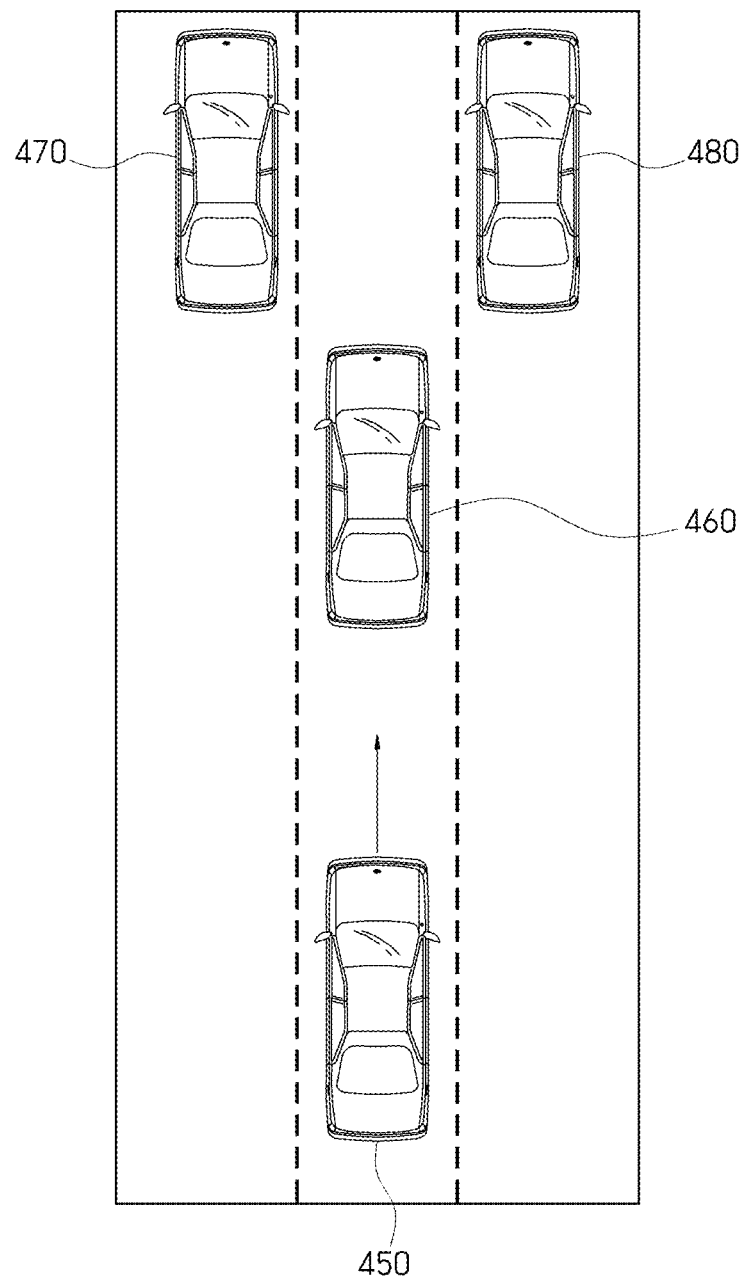
FIG. 4B is a conceptual view for describing another scenario in which an AEB system is applied according to the present invention.

To illustrate a specific scenario, it is assumed that vehicles 420 and 430 in adjacent lanes are traveling behind the closest front vehicle 440 as shown in FIG. 4A. In this case, when the steering avoidance is performed, the steering avoidance determination unit 220 may determine that the risk of collision with an adjacent vehicle is highest, and in this case, determines that the steering avoidance is impossible. However, when vehicles 470 and 480 in adjacent lanes are traveling in front of the closest front vehicle 460 as shown in FIG. 4B the collision risk may be determined differently depending on the speed of the adjacent vehicle when the steering avoidance is performed. For example, in the case of FIG. 4B, when the adjacent vehicles 470 and 480 are operating at higher speed than the closest front vehicle 460, the steering avoidance determination unit 220 may determine that the steering avoidance is possible.

Meanwhile, the steering avoidance determination unit 220 according to an embodiment of the present invention may also reflect driver condition information as expressed in Formula 2 when determining the steering avoidable area or determining whether the steering avoidance is possible.

$$SR=f(Vs,\text{Lat\_accel,driver state}) \quad \text{[Formula 2]}$$

The driver condition refers to the driver's condition (the degree of drowsiness, a gaze direction, a gesture, etc.) recognized through a biometric signal sensor or a camera installed inside the vehicle. The steering avoidance determination unit 220 may derive steering avoidability determination information in consideration of the driver condition information including information indicating the driver condition received from the internal camera and the biometric signal sensor together with the front-view information and the vehicle condition information. For example, when the driver condition is good, the steering avoidance determination unit 220 may set the steering avoidable area to be wider or may determine that the steering avoidance possibility is higher as shown in FIG. 4B.

The AEB control unit 230 according to an embodiment of the present invention receives front-vehicle-to-be-avoided information from the front vehicle determination unit 210, receives the steering avoidability determination information from the steering avoidance determination unit 220, determines an AEB activation time point, and transmits an AEB control command to a braking unit (not shown) at an appropriate AEB control time point.

That is, when the steering avoidability determination information indicates that the steering avoidance is possible and thus early AEB control is not required (e.g., when a flag related to the steering avoidability determination information is set to 1), the AEB control unit 230 outputs, to the braking unit (not shown), an AEB control command for instructing the braking unit to perform braking at a standard (which may be referred to as "regular," "normal," "reference," etc.) AEB braking time point. Alternatively, the AEB control may be performed such that the braking time point is delayed to suppress the intervention of the AEB.

On the other hand, when the steering avoidability determination information indicates that the steering avoidance is impossible (when the flag related to the steering avoidability determination information is set to 0), the AEB control unit 230 transmits, to the braking unit, an AEB control command for instructing the braking unit to perform AEB braking earlier than the standard AEB braking time point or to perform braking more strongly than typical braking.

Also, it may be possible to lock the steering device in order to suppress steering avoidance caused by the driver's miscalculation if it is permitted by law.

In another embodiment, the steering avoidance determination unit 220 may determine whether steering avoidance to the left and right lanes is possible, configure the steering avoidability determination information, and perform steering guidance to direct the driver to a lane in a possible direction or deliver the steering avoidability determination information to a steering control unit (not shown) so that the steering control unit may perform steering to the left or right. Thus, it is possible to prevent a collision. In this case, the steering avoidability determination information (the flag) may include one of, for example, four cases, i.e., case 11 (steerable to the left and right), case 10 (steerable to the left), case 01 (steerable to the right), and case 00 (steering impossible).

An adaptive AEB control method according to an embodiment of the present invention will be described below.

Figure 3:
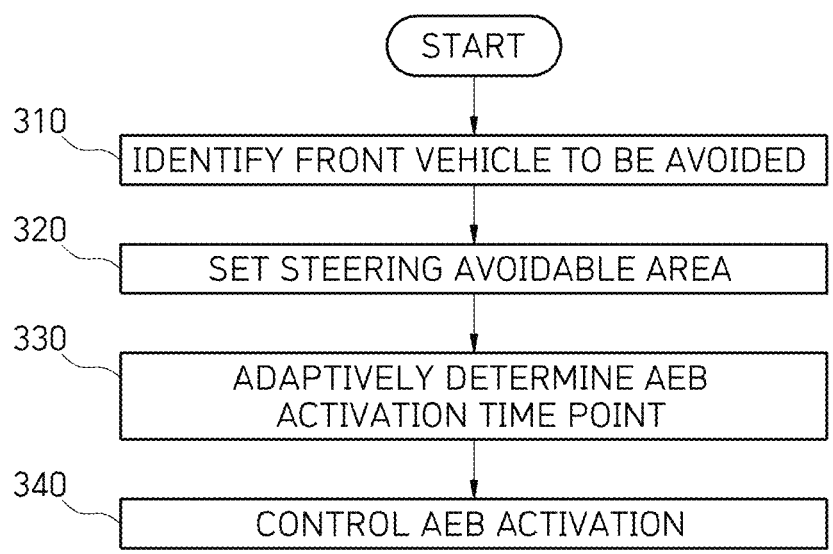
FIG. 3 is a flowchart for describing an adaptive AEB control method according to an embodiment of the present invention.

The adaptive AEB control method according to an embodiment of the present invention and shown in FIG. 3 is an example of the adaptive AEB control method using the adaptive AEB control system according to an embodiment of the present invention and shown in FIG. 2.

The adaptive AEB control system identifies the presence of a front vehicle to be avoided (S310). In detail, as shown in FIGS. 4A and 4B, AEB vehicles 410 and 450 check whether an object having the risk of collision is present ahead using a front-view sensor and an environmental sensor while traveling. In this case, when vehicles 440 and 460 are present ahead, the adaptive AEB control system identifies the types (cars, buses, pedestrians, and the like) of the front vehicles 440 and 460 and determines relative distances and relative speeds with respect to the front vehicles 440 and 460. Additionally, the adaptive AEB control system may determine the speed, longitudinal acceleration, lateral acceleration, and the like of a host vehicle.

After or in parallel to step S310, an adaptive AEB control system sets a steering avoidable area (S320). That is, the adaptive AEB control system sets the steering avoidable area of the AEB vehicle as illustrated in FIG. 5 on the basis of information (front-view information and vehicle state information) originating from the front-view sensor and/or the environmental sensor.

In addition, the adaptive AEB control system finds a relative speed and a relative distance with respect to a front vehicle 520 and the lateral accelerations of the front vehicle and the host vehicle using the environmental sensor and the front-view sensor, finds the steering direction of an AEB vehicle 510 through the environmental sensor, finds a collidable path 540 and a collision avoidance path 550 with respect to the front vehicle 520, and determines whether steering avoidance is possible on the basis of the information to generate steering avoidability determination information.

In the adaptive AEB control method according to an embodiment of the present invention, an AEB activation time point may be adaptively determined in consideration of whether a vehicle is present not only in the collision avoidance path 550 in the driving lane but also in an adjacent lane within a certain distance from the driving lane. The adaptive AEB control system adaptively determines the AEB activation time point depending on whether the vehicle is present in the steering avoidable area set in the above method and also depending on a relative distance, a relative speed, and the like with respect to a front vehicle to be avoided.

When the steering avoidance is difficult due to the presence of the vehicle in the adjacent lane in the steering avoidance path, the adaptive AEB control system according to an embodiment of the present invention may perform AEB braking earlier than a standard control time point.

Also, the sequential relationship between the adjacent front vehicle and the closest front vehicle, the speed of the adjacent front vehicle, and a relative speed, a relative distance, and the like with respect to the AEB vehicle may be considered to determine an adaptive AEB control time point. In this case, a lateral acceleration indicating a situation in which the adjacent front vehicle changes lanes may also be considered. The adaptive AEB control system controls AEB activation according to the AEB control time point determined in the above method. An adaptive AEB control method according to another embodiment of the present invention will be described below.

FIG. 6 is a flowchart describing an adaptive AEB control method according to another embodiment of the present invention.

The adaptive AEB control method according to an embodiment of the present invention and shown in FIG. 6 is another example of the adaptive AEB control method using the adaptive AEB control system according to an embodiment of the present invention and shown in FIG. 2. This adaptive AEB control method also considers driver condition information.

First, the adaptive AEB control system identifies the presence of a front vehicle to be avoided (S610). In detail, an AEB vehicle checks whether an object having the risk of collision is present ahead using a front-view sensor and an environmental sensor while traveling. In this case, when a vehicle is present ahead, the adaptive AEB control system identifies the front vehicle and determines a relative distance and a relative speed with respect to the front vehicle and the speed, longitudinal acceleration, lateral acceleration, and the like of the AEB vehicle.

Subsequently, the adaptive AEB control system sets a steering avoidable area (S620). That is, the adaptive AEB control system sets the steering avoidable area of the AEB vehicle on the basis of information (front-view information and vehicle state information) originating from the front-view sensor and/or the environmental sensor. Subsequently, the adaptive AEB control system finds a driver state on the basis of driver condition information originating from an internal camera or a biometric signal sensor (S630). Based on the driver condition, the adaptive AEB control system determines whether normal braking is difficult for the driver to do by himself or by herself or whether steering operation is expected to be poor.

The adaptive AEB control system determines the AEB activation time point in consideration of drowsy driving or the driver looking-away which is found from the driver's gaze or eye movements included in the driver condition information as well as the relative speed with respect to the front vehicle and the lateral acceleration of the front vehicle (S640). Subsequently, the adaptive AEB control system controls AEB activation according to the AEB control time point determined in the above method (S650).

For example, in order to avoid a collision with a front vehicle, the adaptive AEB control system may additionally find the driver condition and may determine to apply a stronger braking force at an earlier AEB braking time point than usual even when it is determined that it is difficult for the driver to brake on his or her own or even when the driver is expected to be inexperienced in steering operation and thus it is determined that the possibility of the risk of collision with an adjacent vehicle is high.

According to the present invention, by variably determining an AEB control time point in consideration of a driver condition and/or the presence or absence of vehicles in left and right adjacent lanes within a certain distance as well as vehicles ahead in a driving path, it is possible to reduce the possibility of occurrence of an accident in an unexpected situation while driving and thus to ensure driver safety.

Each of the above-described components has been described as a separate device, but this is only an exemplary description for convenience of explanation and for promotion of understanding. Also, it will be appreciated that the components may be implemented in various forms within the scope of the technical spirit of the present invention. For example, the front vehicle determination unit 210 and the steering avoidance determination unit 220 may be implemented in an integrated manner as one module or may be implemented in a distributed manner as two or more devices.

The methods according to embodiments of the present invention may be implemented as program instructions executable by a variety of computer means and may be recorded on a computer-readable medium. The computer-readable medium may include, alone or in combination, program instructions, data files, data structures, and the like. The program instructions recorded on the computer-readable medium may be designed and configured specifically for the present invention or can be publicly known and available to those skilled in the field of computer software.

Examples of the computer-readable medium may include a hardware device such as ROM, RAM, and flash memory, which are specifically configured to store and execute the program instructions. Examples of the program instruction include machine codes made by, for example, a compiler, as well as high-level language codes executable by a computer, using an interpreter. The above hardware device can be configured to operate as at least one software module in order to perform the operation of the present invention, and vice versa.

The elements of the present invention have been described in detail through exemplary embodiments of the present invention. However, the above-described embodiments are only examples and do not limit the scope of the present invention. Those skilled in the art will be able to make various modifications and changes within the scope of the technical spirit of the present invention from the teaching and suggestions of the present disclosure. Accordingly, the scope of the present invention should be determined by the appended claims.

What is claimed is:

1. An adaptive autonomous emergency braking (AEB) control method comprising:
   identifying a front vehicle to be avoided from a front side of a driving lane on the basis of front-view information acquired through a front-view sensor;
   setting a steering avoidable area on the basis of speed information and lateral acceleration information of a host vehicle;
   adaptively determining an AEB activation time point on the basis of whether a front vehicle is present in the set steering avoidable area; and
   controlling AEB activation on the basis of the adaptively determined AEB activation time point.

2. The adaptive AEB control method of claim 1, wherein the identifying of a front vehicle to be avoided comprises identifying the front vehicle to be avoided in further consideration of vehicle state information received from an environmental sensor.

3. The adaptive AEB control method of claim 1, wherein vehicle state information includes at least one piece of information regarding a vehicular speed, acceleration, and steering direction of a vehicle.

4. The adaptive AEB control method of claim 1, wherein the adaptive determining of an AEB activation time point comprises determining to advance the AEB activation time point when a vehicle is present in the set steering avoidable area.

5. The adaptive AEB control method of claim 4, further comprising locking a steering device of the host vehicle.

6. The adaptive AEB control method of claim 1, wherein the adaptive determining of an AEB activation time point comprises determining to delay the AEB activation time point when no vehicle is present in the set steering avoidable area.

7. The adaptive AEB control method of claim 1, wherein the setting of a steering avoidable area comprises:
   setting a safe steerable area;
   determining an expected driving path for the host vehicle; and
   setting a portion of the safe steerable area excluding an area included in the expected driving path as the steering avoidable area.

8. The adaptive AEB control method of claim 7, wherein the determining of an expected driving path comprises performing a process of finding a vehicle traveling direction using at least one of a gyro sensor and a steering angle sensor and predicting a driving path corresponding to a subsequent moment from the vehicle traveling direction.

9. An adaptive autonomous emergency braking (AEB) system comprising:
   a front vehicle determination unit configured to identify a front vehicle to be avoided on the basis of front-view information received from a front-view sensor and vehicle state information received from an environmental sensor;
   a steering avoidance determination unit configured to determine whether steering avoidance is possible on the basis of the front-view information received from the front-view sensor and vehicle state information received from the environmental sensor; and
   an AEB control unit configured to determine AEB control on the basis of front-vehicle-to-be-avoided information received from the front vehicle determination unit and steering avoidability determination information received from the steering avoidance determination unit,
   wherein the steering avoidance determination unit is further configured to set a steering avoidable area on the basis of speed information and lateral acceleration information of an AEB vehicle.

10. The adaptive AEB system of claim 9, wherein the AEB control unit delivers, to a vehicle braking unit, an AEB control comment for instructing the vehicle braking unit to perform AEB activation at an early time point when the steering avoidability determination information which is associated with the front vehicle to be avoided and which is received from the front vehicle determination unit indicates that the steering avoidance is not possible.

11. The adaptive AEB system of claim 9, wherein the AEB control unit delivers, to a vehicle braking unit, an AEB control comment for instructing the vehicle braking unit to perform AEB activation at a standard time point when the steering avoidability determination information which is associated with the front vehicle to be avoided and which is received from the front vehicle determination unit indicates that the steering avoidance is possible.

12. The adaptive AEB system of claim 9, wherein the front vehicle determination unit finds a change in a vehicular heading angle from at least one of a steering angle sensor and a gyro sensor of the AEB vehicle and determines a front vehicle in consideration of the change.

13. The adaptive AEB control system of claim 9, wherein the environmental sensor includes at least one piece of information regarding a vehicular speed, acceleration, and steering direction, and the front-view sensor includes a radar, a camera, and a fusion of the radar and the camera.

14. The adaptive AEB control system of claim 9, wherein the steering avoidance determination unit receives driver condition information from at least one of an internal camera and a biometric signal sensor, each of which provides information regarding a driver condition, and determines whether steering avoidance is possible.

15. An adaptive autonomous emergency braking (AEB) control method comprising:
   identifying a front vehicle to be avoided from a front side of a driving lane on the basis of front-view information acquired through a front-view sensor;
   setting a steering avoidable area on the basis of speed information and lateral acceleration information of an AEB vehicle;
   acquiring driver condition information using at least one of an internal camera and a biometric signal sensor and determining whether a driver is able to perform normal braking;
   adaptively determining an AEB activation time point on the basis of whether a vehicle is present in the set steering avoidable area, a relative speed, and whether the driver is able to perform normal braking; and
   controlling AEB activation on the basis of the adaptively determined AEB activation time point.

16. The adaptive AEB control method of claim 15, wherein the driver condition information includes at least one of whether the driver is drowsy while driving, the driver's gaze direction, and whether the driver is able to drive.

\* \* \* \* \*